No. 759,261. PATENTED MAY 10, 1904.
A. H. FRINK & C. H. LISTER.
RULER.
APPLICATION FILED JULY 20, 1903.
NO MODEL.
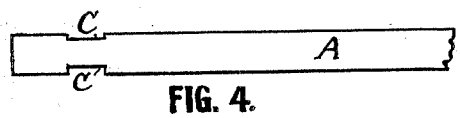
FIG. 4.
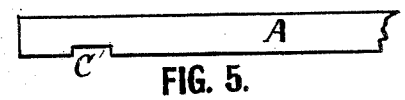
FIG. 5.
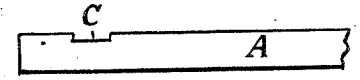
FIG. 6.
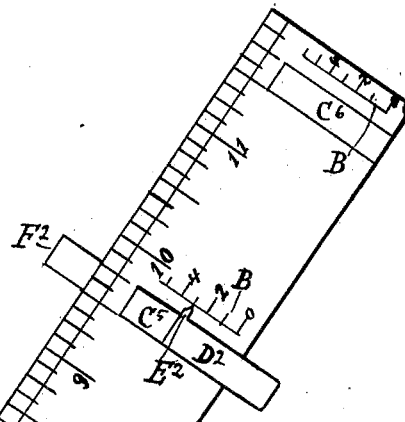
FIG. 1.
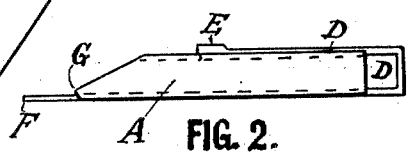
FIG. 2.
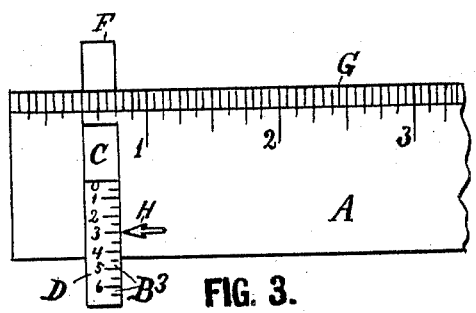
FIG. 3.
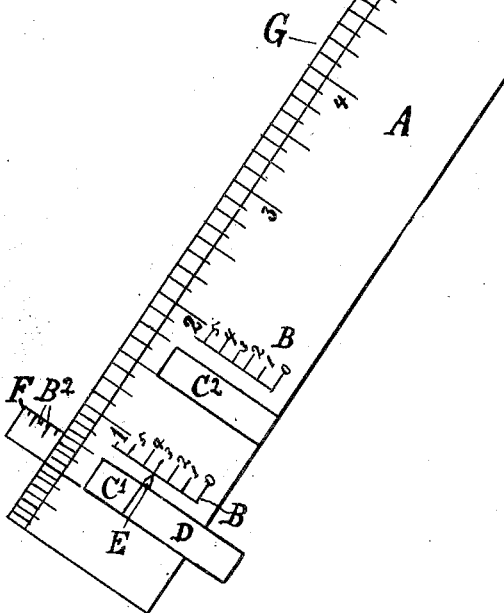
WITNESSES:
H. Larson.
D. E. Carlsen.
INVENTORS:
Arthur H. Frink.
Charles H. Lister.
BY THEIR ATTORNEY.
A. M. Carlsen.
THE NORRIS PETERS CO., PHOTO-LITHO., WASHINGTON, D. C.

No. 759,261. Patented May 10, 1904.

UNITED STATES PATENT OFFICE.

ARTHUR H. FRINK AND CHARLES H. LISTER, OF ST. PAUL, MINNESOTA.

RULER.

SPECIFICATION forming part of Letters Patent No. 759,261, dated May 10, 1904.

Application filed July 20, 1903. Serial No. 166,419. (No model.)

*To all whom it may concern:*

Be it known that we, ARTHUR H. FRINK and CHARLES H. LISTER, citizens of the United States, residing at St. Paul, in the county of Ramsey and State of Minnesota, have invented certain new and useful Improvements in Rulers; and we do declare the following to be a full, clear, and exact description of the invention, such as will enable others skilled in the art to which it appertains to make and use the same, reference being had to the accompanying drawings, and to the letters of reference marked thereon, which form part of this specification.

Our invention relates to improvements in devices for ruling paper and books; and the primary object of the invention is to provide a ruler with means whereby the distance between and the parallelism of the lines may easily be regulated and maintained. This and other objects we attain by the novel construction and combination of parts illustrated in the accompanying drawings, in which—

Figure 1 is a top or plan view of our complete ruling device or ruler. Fig. 2 is an end view of Fig. 1. Fig. 3 is a portion of Fig. 1 modified. Figs. 4, 5, and 6 are rear edge views of a portion of the ruler proper, showing modified forms.

Referring to the drawings by letters of reference, A designates the ruler proper and is in Fig. 1 shown as a twelve-inch scale laid out in inches and fractions of inches as small as may be desired. Transversely upon the ruler are marked scales B B, and adjacent each of the latter scales the ruler is provided with transverse guiding-grooves C, which may be at top and bottom, as in Figs. 2 and 4, or only at the bottom, as in Fig. 5, or only at the top, as in Fig. 6. In Fig. 1 those grooves are for purpose of explanation marked $C'$ $C^2$ $C^3$, &c. The groove $C'$ is near the starting end of the ruler, and the groove $C^2$ is one inch away from groove $C'$. From groove $C^2$ to groove $C^3$ is preferably four inches, and the rest of the grooves $C^4$, $C^5$, and $C^6$ are preferably two inches apart. In the groove $C'$ is inserted one arm of a clasp-shaped slide D, gripping the ruler and having a pointer E pointing upon the adjacent scale B to indicate how much beyond the straight-edge or ruler projects the end F of the arm of the clasp extending across the under side of the ruler. Near the other end of the ruler is a similar slide $D^2$, with pointer $E^2$ and projecting end $F^2$. The straight-edge G, used to guide the pen or pencil in ruling a sheet, stands so much higher than the bottom of the ruler that even if the latter is grooved for the lower arm of the slide D such groove will not affect the straightness of the edge G, as can be seen best in Fig. 2.

In the general use of the device if a page or other sheet is to be ruled the ends F $F^2$ of the slides are projected the desired distance beyond the edge of the ruler and placed to the edge of the sheet, while the first line is drawn along the edge G. The ruler is then moved back from the line drawn until the points or ends F $F^2$ merely touch the line. The second line is then drawn, and the device is further moved back so that the ends F $F^2$ come to the second line while the third line is being ruled, and so on. If the width between the lines is to be changed, as in ruling for dollars and cents, the slides or sliding gages D are easily adjusted back or forth by the fingers. For paper of various width the slides D are moved to the various grooves C in the ruler. These grooves may be of any number; but an economical arrangement is to have the grooves arranged about as in Fig. 1, so that by moving the slide $D^2$ the ruler is changed two inches in its length, and each of such variations may be increased or decreased one inch by moving the slide D from one to another of the grooves $C'$ $C^2$. The distance between the slides may thus be reduced inch for inch until the two slides are at $C^2$ and $C^3$ for ruling paper only four inches wide. Should shorter lines be required, the slides may be placed at $C^3$ and $C^4$ or even at $C'$ and $C^2$, so that the length of the lines may practically be varied from one to eleven inches, which is supposed to answer all ordinary purposes, and for extraordinary purposes the ruler may simply be made longer.

In Fig. 1 is indicated a modification by which the end or arm F is provided with the scale $B^2$ to take the place of the scale B and pointer E. Another modification is shown in Fig. 3, where the scale B or B² is upon the bar D and instead of the pointer E in Fig. 1 a dart H or similar mark is provided upon the ruler A adjacent the scale.

Having thus described our invention, what we claim, and desire to secure by Letters Patent, is—

1. The combination with a ruler or straight-edge having a graduated scale along one of its edges and transverse grooves upon its body, of transversely-sliding gages formed like clasps so as to be friction-held upon the ruler and guided by the grooves in same, and scales and indicators to show the distance the gages project beyond the ruler.

2. The combination with a ruler or straight-edge having a graduated scale along one of its edges and transverse grooves upon its body, of transversely-sliding gages formed like clasps so as to be friction-held upon the ruler and guided by the grooves in same, and scales and indicators to show the distance the gages project beyond the ruler, two of said grooves being near one end of the ruler and nearer each other than the rest of the grooves, which are at various points along the body of the ruler, for the purpose set forth.

In testimony whereof we affix our signatures in presence of two witnesses.

ARTHUR H. FRINK.
CHARLES H. LISTER.

Witnesses:
F. G. MARSHALL,
OTTO C. BAUER.